Figure 1:
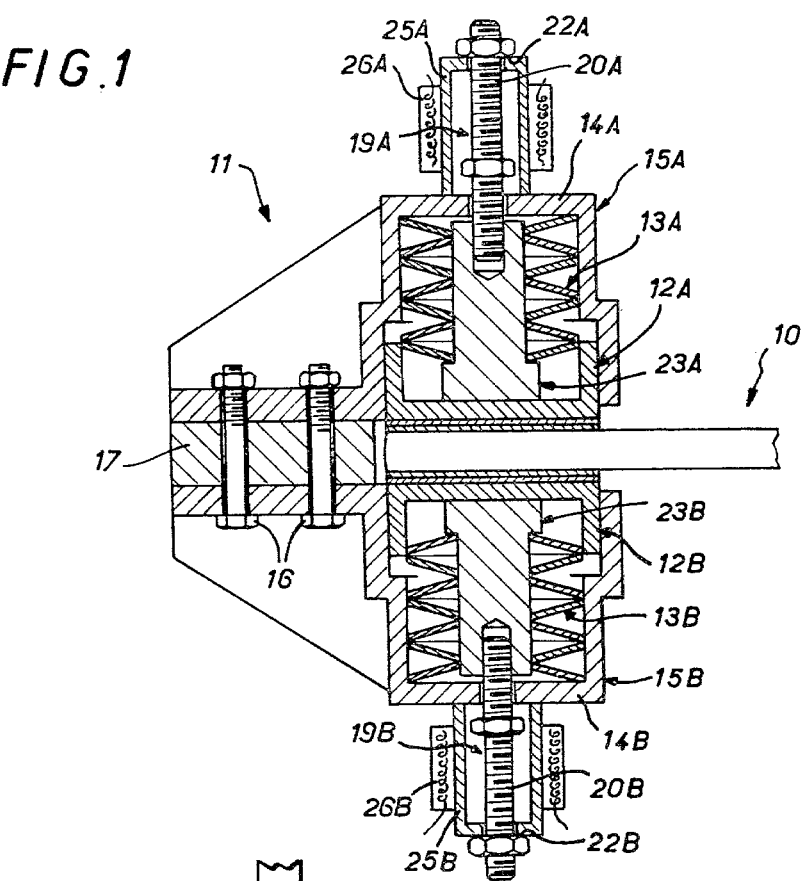

United States Patent [19]

Rogier

[11] 4,351,423

[45] Sep. 28, 1982

[54] METHOD FOR LIMITED, GRADUAL DISENGAGEMENT OF A BRAKE, AND SUCH A BRAKE

[75] Inventor: Léonce Rogier, Saint-Denis, France

[73] Assignee: Valeo, Paris, France

[21] Appl. No.: 203,950

[22] Filed: Nov. 4, 1980

[30] Foreign Application Priority Data

Nov. 14, 1979 [FR] France .............................. 79 28034

[51] Int. Cl.³ ............................................ B60T 13/04
[52] U.S. Cl. .................................... 188/216; 188/166; 188/72.3
[58] Field of Search ............... 188/166, 167, 67, 189, 188/110, 71.1, 71.3, 72.1, 72.3, 171, 173, 216, 79.5 B; 187/89–91, 77; 303/80, 85, 78, 71, 74, 1, 6 M

[56] References Cited

U.S. PATENT DOCUMENTS 3,872,949  3/1975  Snyder ................................. 187/89
3,942,607  3/1976  Sobat ................................... 187/77

FOREIGN PATENT DOCUMENTS 1422956  11/1965  France .
1476750  3/1967  France .

*Primary Examiner*—Douglas C. Butler
*Attorney, Agent, or Firm*—Charles E. Brown

[57] ABSTRACT

An industrial emergency brake is disclosed in which the braking members are disengaged gradually from the brake disc or the like after detonation of an explosive component or electromagnetic de-energization by a stud in threaded engagement with the braking member, a thermally expandable wedging member interposed between a fixed support for the brake and an abutment such as a nut on the stud. An electrical resistor or a high frequency heater heats the wedging member and gradually disengages the braking member from the brake disc.

10 Claims, 2 Drawing Figures

U.S. Patent   Sep. 28, 1982   4,351,423

METHOD FOR LIMITED, GRADUAL DISENGAGEMENT OF A BRAKE, AND SUCH A BRAKE

The present invention relates generally to brakes and more particularly though not exclusively to emergency brakes, that is, brakes which are intended to be used exceptionally in case of a pressing necessity.

Such emergency brakes are used notably in industry for equipment such as hoists, fixed cranes and travelling cranes. They are normally in their open or disengaged position and actuated to their closed or engaged position, manually or automatically, in case of danger to arrest the movable load which is being controlled.

Generally speaking, such an industrial emergency brake usually comprises a fixed support, a brake member, and at least one braking member adapted to be applied against the brake member. Force-applying means such a resilient means constantly urge the braking member towards the brake member and releasable retaining means normally maintain the braking member out of engagement with the brake member.

The term "brake member" is defined as the member against which the braking members are applied. Accordingly the brake member may be a movable member fixed for movement with a movable load to be controlled or a fixed member such as a belt or slide when the brake is carried on such a movable load in which case the support is considered fixed with respect to the brake member.

Most often the releasable retaining means comprise an active element such as an electromagnet or a hydraulic piston-and-cylinder unit.

However, it has been proposed in a copending application Ser. No. 188,197 filed Sept. 19, 1980 and assigned to the assignee of the present application that the releasable retaining means should be a passive element, namely, an explosive component fractured upon detonation.

In any event in such industrial emergency brakes of this type one of the problems to be dealt with is the provision of limited, gradual disengagement of the braking members in order to ensure a slow, controlled return of the load to a predetermined position.

When the releasable retaining means for the braking member comprise an active element it normally suffices to gradually apply the same.

However, it may happen that the limited disengagement of the brake must be effected by mechanical action on the braking member, the latter being attached for this purpose to a threaded stud accessible to the exterior which is the threadedly engaged with a nut to exert traction on the braking member against the action of the force-applying means which continues to be applied to the braking member.

In case the releasable retaining means associated with the braking member comprises an explosive component all that is possible for the sought-after limited, gradual disengagement is such mechanical action. But operating on such equipment the threaded displacement involved may be uneasy and difficult to carry out.

A general object of the invention is to provide an industrial emergency brake which overcomes this drawback.

According to a first aspect of the invention there is provided a method for limited, gradual disengagement of a brake comprising a support, a brake member, and at least one braking member, resilient means urging the braking member towards said brake member, the said method comprising attaching the braking member to a stud having an abutment thereon, interposing a thermally expandable wedging member between the support and said abutment, and heating the thermally expandable wedging member thereby disengaging the brake member gradually.

According to a second aspect of the invention there is provided a brake comprising a support, at least one braking member, resilient means constantly urging the braking member towards a brake member, a stud attached to said braking member, and an abutment provided on the stud facing the support, characterized in that a thermally expandable wedging member is interposed between the support and the abutment on the stud, and heating means arranged in heat transfer relationship with the thermally expandable wedging member for heating the thermally expandable wedging member and thereby applying traction to the stud for disengaging the brake member.

Thus according to the invention the sought-after gradual, limited disengagement is achieved by heating the thermally expandable wedging member.

Experience has shown that the expansion of the thermally expandable wedging member by heating is sufficient to effect disengagement which involves a moderate displacement of the braking member of the order of several tenths of a millimeter for example.

Advantageously it is possible to operate on the equipment involved whenever necessary simply by inserting the thermally expandable wedging member. Alternatively the thermally expandable wedging member may be provided on the brake previously.

In any event the heating of the thermally expandable wedging member may be remote-controlled by means of an electrical heater or a high frequency heater.

Figure 2:
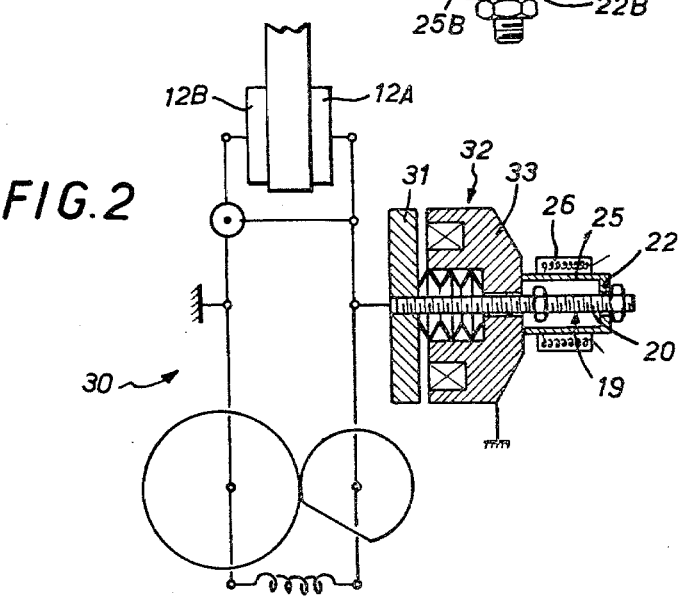

These and other features and advantages of the invention will be brought out in the description which follows, given by way of example, with reference to the accompanying schematic drawings, in which:

FIG. 1 is a longitudinal sectional view through an industrial emergency brake provided with a thermally expandable wedging member; and FIG. 2 is a block diagram of another brake embodying the invention with the force applying means and the disengagement means and the thermally expandable wedging member shown in section.

FIG. 1 illustrates, by way of example, the application of the invention to an industrial emergency such as shown in the aforesaid copending patent application Ser. No. 188,197. This patent application is incorporated herein by reference. Further the details of such a brake are not part of the present invention and therefore need not be described in detail herein.

Suffice is to say that in order to operate a brake member formed as a rotary disc 10 two braking members 12A, 12B are provided, each being applied to one of the sides of the disc 10 symmetrically with respect thereto, and each being urged constantly by force-applying means towards the disc 10.

In the embodiment illustrated the force-applying means comprise stacks of Belleville washers 13A, 13B which bear against a fixed support 11 and more specifically the endwall 14A, 14B of a hollow body 15A, 15B accommodating the assembly and fastened by screws 16 to a support flange 17 disposed in line with the brake disc 10.

Releasable retaining means are associated with the braking members 12A, 12B. As described in the above-mentioned copending application the releasable retaining means comprise explosive components. The explosive component is not shown in FIG. 1 as the disc 10 is shown in its braked position clamped between the braking members 12A, 12B after the explosive component has been fractured and is no longer operative.

As is known per se each braking member 12A, 12B is attached to a stud 19A, 19B accessible from the exterior. Generally such a threaded stud 19A, 19B comprises a threaded shank 20A, 20B which traverses the fixed support 11 and more specifically the endwall 14A, 14B of the corresponding hollow body 15A, 15B, and an abutment or shoulder 22A, 22B which is fixed to the shank 20A, 20B and faces the endwall of the fixed support.

In the illustrated embodiment since the shank 20A, 20B is threaded the abutment is conveniently defined by a nut in threaded engagement with the threaded shank. The threaded shank 20A, 20B is in turn in threaded engagement with a plunger 23A, 23B which itself is fixed to the corresponding braking member 12A, 12B.

The threaded shank 20A, 20B may be initially provided on the brake before it is actuated, namely when the explosive component is a nut, which nut is in threaded engagement with the threaded shank and bears against the fixed support 11, before it is fractured, to retain the braking member 12A, 12B out of engagement with the brake disc 10.

Alternatively such a threaded shank 20A, 20B may be brought into place after actuation of the brake in order to gradually disengage the corresponding braking member.

According to the invention for limited, gradual disengagement there is associated with each braking member 12A, 12B of such a brake a thermally expandable wedging member 25A, 25B adapted to be interposed between the fixed support 11 and the abutment 22A, 22B on the corresponding stud 19A, 19B, in combination with heating means 26A, 26B in heat transfer relationship with the thermally expandable wedging member 25A, 25B.

In the illustrated embodiment the thermally expandable wedging member 25A, 25B comprises an annular member and thereby is adapted to be received on the threaded shank 20A, 20B of the corresponding stud 19A, 19B. In actual practice the thermally expandable wedging member 25A, 25B is positioned around the threaded shank 20A, 20B of the corresponding stud 19A, 19B before the nut defining the abutment 22A, 22B is screwed on the stud 19A, 19B. The nut is then screwed into place on the stud 19A, 19B exerting the thermally expandable wedging member 25A, 25B against endwall 14A, 14B of the corresponding hollow body 15A, 15B of the fixed support 11.

The heating means 26A, 26B need then only be turned on. As illustrated the heating means 26A, 26B comprise an electrical resistor which is permanently mounted on the associated thermally expandable wedging member 25A, 25B, and the power supply for the electrical resistor may be remote controlled.

During heating of the thermally expandable wedging member 25A, 25B the latter expands, applying traction to the stud 19A, 19B in the direction corresponding to the disengagement of the associated braking member 12A, 12B.

To control the disengagement, the power supplied to the electrical resistor is regulated taking into account the kind of material of which the thermally expandable wedging member is made. For example, the thermally expandable material may be a light metal, e.g., aluminum or, alternatively, steel.

In FIG. 2 the application of the invention to an industrial emergency brake is shown in which for braking the brake disc 10 two braking members 12A, 12B are connected by a special kinematic linkage which is not per se part of the present invention and is well known per se and will not be described in detail, to an armature 31 of an electromagnet 32 which comprises the releasable retaining means associated with the braking members 12A, 12B and whose yoke 33 is connected to a fixed support (not shown).

As in the embodiment of FIG. 1, the stud 19 comprises a threaded shank 20 and an abutment formed by a nut threadedly engaged with the threaded shank.

According to the invention a thermally expandable wedging member 25 is associated with the brake and adapted to be interposed between the yoke 33 of the electromagnet 32, and therefore the fixed support, and the abutment 22 on the stud 19, heating means 26 are associated with the thermally expandable wedging member 25.

Hereinabove it has been assumed that the thermally expandable wedging member is installed only when necessary for the sought-after limited, gradual disengagement of the braking members. Alternatively, it may be permanently mounted on the brake. In the latter case the nut defining the abutment is normally not applied against the thermally expandable wedging member, in order to provide clearance with the corresponding braking member and it is brought into contact with the thermally expandable wedging member only when the desired limited, gradual disengagement is desired.

The present invention is not limited to the two embodiments illustrated and described herein but encompasses modifications and alternatives without departing from the scope of the appended claims.

In particular the abutment on the stud against which the thermally expandable wedging member bears is not necessarily a nut. It need only be a part adjustably mounted on the stud, e.g., by means of a key, for that part to be able to exert the thermally expandable wedging member against the fixed support or a part fixed in relation thereto.

Moreover, the heating means employed are not necessarily comprised of an electrical resistor; in fact any other kind of heating means may suitable, for example, a high frequency heater.

Furthermore, the field of use of the present invention is not limited to brakes having a disc brake member but on the contrary encompasses drum or cylindrical brake members and more generally all elongate brake members such as in belt brakes or jaw brakes regardless of the corresponding structure of the brake.

The force applying means and the disengagement means may also be different from those disclosed herein.

Finally the field of use of the invention is not limited to emergency brakes but on the contrary covers all types of brakes, and namely working brakes.

What I claim is:

1. A method for limited, gradual disengagement of a brake comprising a support, a brake member, and at least one braking member, resilient means urging the braking member towards said brake member, wherein said method comprises the steps of:

attaching said braking member to a stud having an abutment thereon;
interposing a thermally expandable wedging member between said support and said abutment; and
heating said thermally expandable wedging member thereby disengaging said braking member gradually.

2. The method according to claim 1, comprising actuating the heating of said thermally expandable wedging member by remote control.

3. The method according to claim 1 or 2, wherein said heating step comprises heating said thermally expandable wedging member with an electrical resistor in heat transfer relationship therewith.

4. The method according to claim 1 or 2, wherein said heating step comprises heating by high frequency.

5. A brake comprising a support, at least one braking member, resilient means constantly urging said braking member towards a brake member, a stud attached to said braking member, and an abutment provided on said stud facing said support, wherein the improvement comprises a thermally expandable wedging member interposed between said support and said abutment on said stub, and heating means in heat transfer relationship with said thermally expandable wedging member for heating said thermally expandable wedging member and thereby applying traction to said stud for disengaging said braking member.

6. The brake according to claim 5, said brake being an emergency brake, said thermally expandable wedging member bearing on an annular member adapted to be received on the shank of said stud.

7. The brake according to claim 5 or 6, wherein said abutment is adjustably mounted on said stud.

8. The brake according to claim 7, said abutment comprising a washer.

9. The brake according to claim 7, wherein said stud has a threaded shank and said abutment comprises a nut in threaded engagement therewith.

10. The brake according to claim 7, wherein said abutment comprises a wedge adjuster.

* * * * *